United States Patent [19]

Kahle

[11] Patent Number: 4,783,685

[45] Date of Patent: Nov. 8, 1988

[54] READER-PRINTER

[75] Inventor: Todd Kahle, Hartford, Wis.

[73] Assignee: Xidex Corporation, Palo Alto, Calif.

[21] Appl. No.: 104,358

[22] Filed: Oct. 2, 1987

[51] Int. Cl.⁴ .......................................... G03B 13/28
[52] U.S. Cl. ........................................ 355/45; 355/8; 355/11; 355/66
[58] Field of Search .................. 355/44, 45, 66, 8, 11

[56] References Cited

U.S. PATENT DOCUMENTS

| | | | |
|---|---|---|---|
| 4,616,925 | 10/1986 | Saijo et al. | 355/45 |
| 4,636,059 | 1/1987 | Thompson | 355/45 |
| 4,648,707 | 3/1987 | Tanasescu | 355/45 |
| 4,666,284 | 5/1987 | Yamada | 355/45 |

Primary Examiner—Monroe H. Hayes
Attorney, Agent, or Firm—Mason, Kolehmainen, Rathburn & Wyss

[57] ABSTRACT

A reader-printer apparatus is disclosed for displaying and printing microimages, such as microimages of computer data, from microfiche having a plurality of frames wherein the major axis of each frame is oriented transversely. The apparatus is adapted to print such microimages lengthwise onto a sheet of standard recording paper without the use of a prism to rotate the image. The microfiche is received into a carriage defining an object plane. The microimage may be selectively displayed on a viewing screen or alternatively recorded on standard paper. In the print mode, the image is scanned and consecutively projected onto a photoconductive drum which is rotatable about an axis generally parallel to the viewing plane.

48 Claims, 9 Drawing Sheets

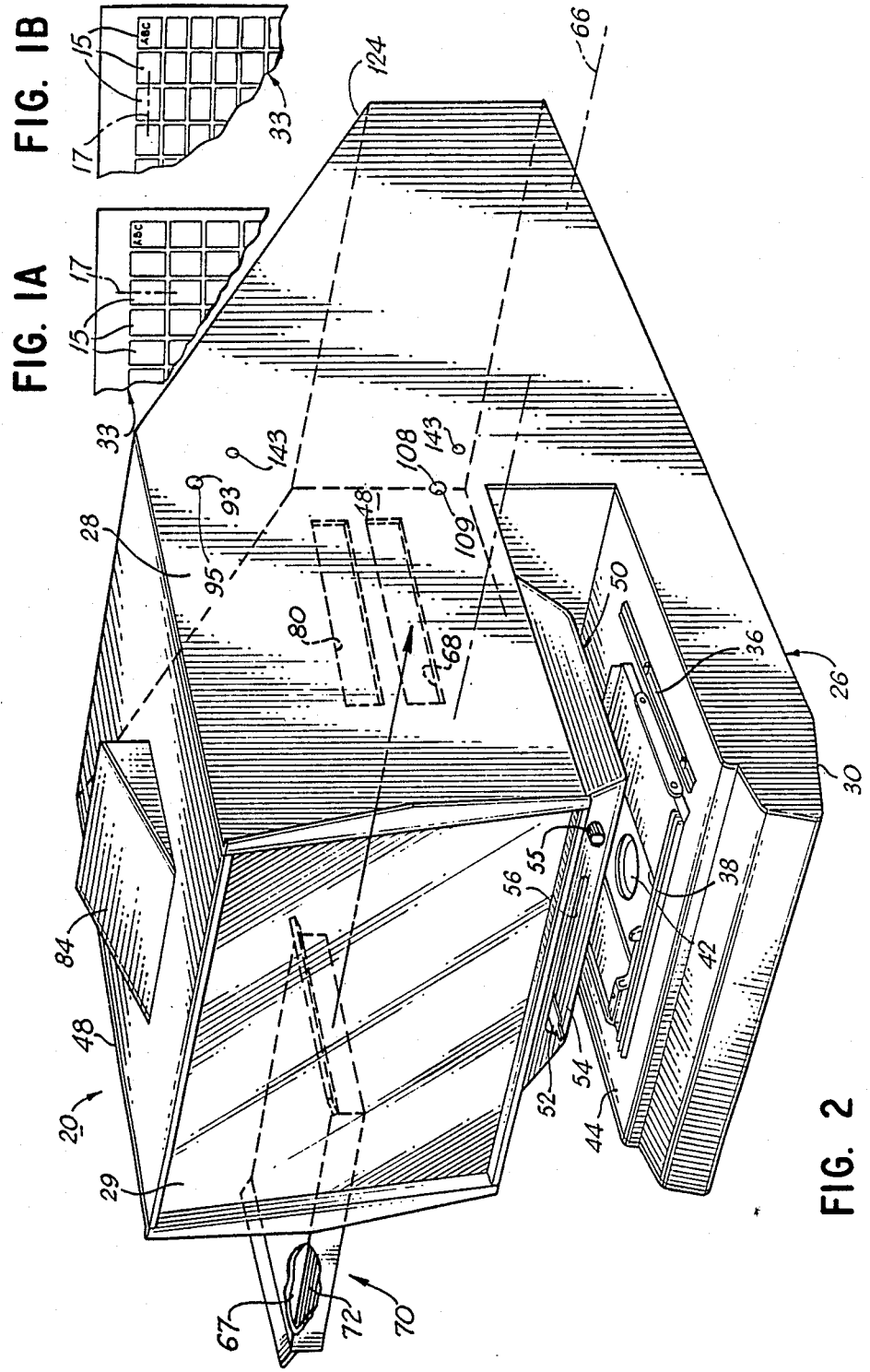

READER-PRINTER

BACKGROUND OF THE INVENTION

1. Field of the Invention

This invention generally relates to a reader-printer apparatus for viewing and printing microimages, such as microimages of computer data, disposed on microfiche and the like and in particular to an apparatus having a viewer and a slit exposure type image recording device which is particularly adapted to printing microimages lengthwise onto standard recording size paper from microfiche having a plurality of frames wherein the major axis of each frame is oriented transversely.

2. Description of the Prior Art

Various reader-printer apparatus are known in the art. Examples of such apparatus are disclosed in U.S. Pat. Nos. 4,310,241; 4,367,033; 4,447,147 and 4,593,996. In general, these apparatus are adapted to receive text, data, drawings or other information which have been recorded on microfiche, microfilm, aperture cards and the like and display the information on a viewing screen and, if desired, record the information on a suitable recording medium. Both full exposure and slit exposure type image recording apparatus are known. In general, in an apparatus having a full exposure type printer, the entire image is formed on the recording medium at one time. An example of such a system is disclosed in U.S. Pat. No. 4,593,996 to Kubono, et al. In a slit exposure type image recording apparatus, the image is formed on the recording medium in sections by scanning consecutive portions of the object being reproduced. The scanning speed in such a device must be synchronized with the rate at which the image is being recorded.

Two types of slit exposure type image recording apparatus are known in the art. Either a fixed optical system or a moving optical system may be utilized to form the image in consecutive portions on the recording medium. Fixed optical type systems are particularly suited for use with aperture cards. In such a system, the optical system is stationary and the original object is moved relative to the optical system. An example of such a system is disclosed in U.S. Pat. No. 4,310,241 to Inoue wherein a movable aperture card carriage is utilized. The fixed optical system includes a fixedly mounted lamp, lens, a vertically oriented slit and a mirror. Light rays from the lamp are projected through the lens and vertically oriented slit to project a portion of the image on the aperture card onto a mirror which reflects the rays onto a drum for recording an image on a recording medium. The object plane is defined by the aperture card and is generally perpendicular to the incident light rays from the lamp. In any given position of the aperture card with respect to the incident light rays, an image corresponding to a vertical slice of the object is formed on the recording medium. Thus, by moving the aperture card in a direction perpendicular to the incident light rays, the object can be consecutively formed on the recording medium.

In an apparatus having a moving optical system, the object is maintained in a stationary position and at least a portion of optical system is moved relative to the object in order to provide scanning by redirecting the projected image. This type of system is adapted for use with microfiche, aperture cards, microfilm, and the like. U.S. Pat. No. 4,367,033 to Wanatabe discloses such a system. In general, microfiche is placed in a carrier which maintains it in a fixed position relative to the optical system. Through the use of a slit member, the optical system projects a portion of the image at a time onto the recording medium. By moving at least a portion of the optical system relative to the object, the entire image is formed on the recording medium. More specifically, the original object recorded on microfiche is placed in a carriage defining an object plane. A source of light and a lens are arranged with respect to the microfiche such that the light rays are generally perpendicular to the image. The emergent light rays from the lens are reflected from movable mirrors onto a recording medium. The movable mirrors are carried by a scanning apparatus adapted to move along a plane which is generally perpendicular to the emergent light rays. The scanning apparatus carries a mirror at each end. When the scanning apparatus moves in a direction perpendicular to the emergent light rays from the lens, consecutive portions of the image are formed on the recording medium.

In both the full exposure and slit exposure type printing apparatus that have viewers, the system can only be operated in one mode at a time - either in a viewing mode or a printing mode. Generally, mirrors utilized in the system are associated with either the viewing mode or the printing mode. In order to avoid an unnecessarily complicated optical system and to avoid interference of the light rays between the viewing mode mirrors and print mode mirrors, some of the mirrors are pivotably mounted and swing out of the way when the system is operated in a mode in which the mirror is not used. For example, in the print mode one or more viewing mirrors may be made to swing out of the print mode optical path.

All of the aforementioned prior art reader-printer apparatus are adapted to receive microfiche and the like having a plurality of frames wherein the major axis of each frame is oriented vertically as shown in FIG. 1a. However, such apparatus will not perform satisfactorily with microfiche or the like wherein the major axis of the frames is oriented transversely as shown in FIG. 1b. Microfiche having frames oriented as depicted in FIG. 1b are generally used for computer data, which have been microfilmed from so-called "green bar" computer paper. Since green bar paper is generally 14 inches across by 11 inches long with the data printed parallel to the 14⅞-inch edge, it is desirable to print images from such paper onto standard 8½-inch by 11-inch paper such that the data is parallel to the 11-inch edge of the recording paper to avoid having a portion of the data cut off. In the aforedescribed prior art apparatus, in order to print such computer data recorded on microfiche having frames with the major axis oriented transversely as in FIG. 1b, the original image would have to be transposed orthogonally. In some known prior art reader-printer apparatus the object is transposed manually. In the apparatus disclosed in U.S. Pat. No. 3,907,418 to Okuyama, a prism is used to transpose the image in the printing mode. However, manually transposing the object would be unduly cumbersome for a machine used primarily for printing copies of microfiche wherein the major axis of each of the frames is oriented transversely. Moreover, the addition of the prism to the apparatus complicates the optics within the apparatus.

SUMMARY OF THE INVENTION

It is an object of the present invention to solve the problems associated with the prior art reader-printer apparatus used to print microimages recorded on microfiche and the like having a plurality of frames wherein the major axis of each frame as oriented transversely.

It is another object of the present invention to provide a reader-printer apparatus suitable for viewing and printing computer data recorded on microfiche and the like.

It is yet another object of the invention to provide a microfiche printing apparatus for recording original images of recording data without utilizing a prism.

In summary, the invention relates to an apparatus for viewing and, alternatively, printing microimages recorded on microfilm, microfiche, aperture cards, and the like onto a recording medium. The apparatus comprises a carrier for receiving microfiche which defines an object plane perpendicular to the plane of viewing. The images are recorded on a recording medium which is carried by a rotatable drum by way of a known electrophotographic process. The drum is rotatable about an axis parallel to the object plane. The original image is selectively projected onto the recording medium by consecutively scanning portions of the original microimage along an axis generally perpendicular to the axis about which the drum rotates and parallel to the viewing plane. The above described apparatus is adapted to print microimages recorded on microfiche and the like wherein the major axis of each frame thereon is oriented transversely onto standard recording paper without the necessity of a prism or the need to manually transpose the image.

BRIEF DESCRIPTION OF THE DRAWING

These and other objects and features of the present invention will become better understood from the following description with reference to the accompanying drawing, in which:

FIG. 1a is a fragmentary view of microfiche and the like having a plurality of frames wherein the major axis of each frame is oriented vertically;

FIG. 1b is a fragmentary view of microfiche and the like having a plurality of frames wherein the major axis of each frame is oriented transversely;

FIG. 2 is a front perspective view of the reader-printer apparatus in accordance with the present invention;

DETAILED DESCRIPTION

The present invention relates to an apparatus for viewing and printing microimages recorded on various microforms, such as microfilm, microfiche, aperture cards and the like. Microfilm is often used for financial and business data and consists of 16 mm or 35 mm film up to 225 feet long wound on spools up to approximately 4 inches in diameter. Microfiche is generally used in micropublishing systems where it is necessary to distribute a large number of copies. Microfiche is generally 6 inches by 4 inches or 80-column punch card size and contains between 60 and 200 microimages depending on the reduction ratio. An aperture card consists of an 80-column punched card having a hole for receiving a single 16 mm or 35 mm microimage. Aperture cards are generally used for engineering drawings. As used herewithin, the term microfiche shall be used to refer to all of the various types of microforms described. As will be appreciated by those of ordinary skill in the art, the principles of the present invention are not limited by the specific microform used.

Figure 3:
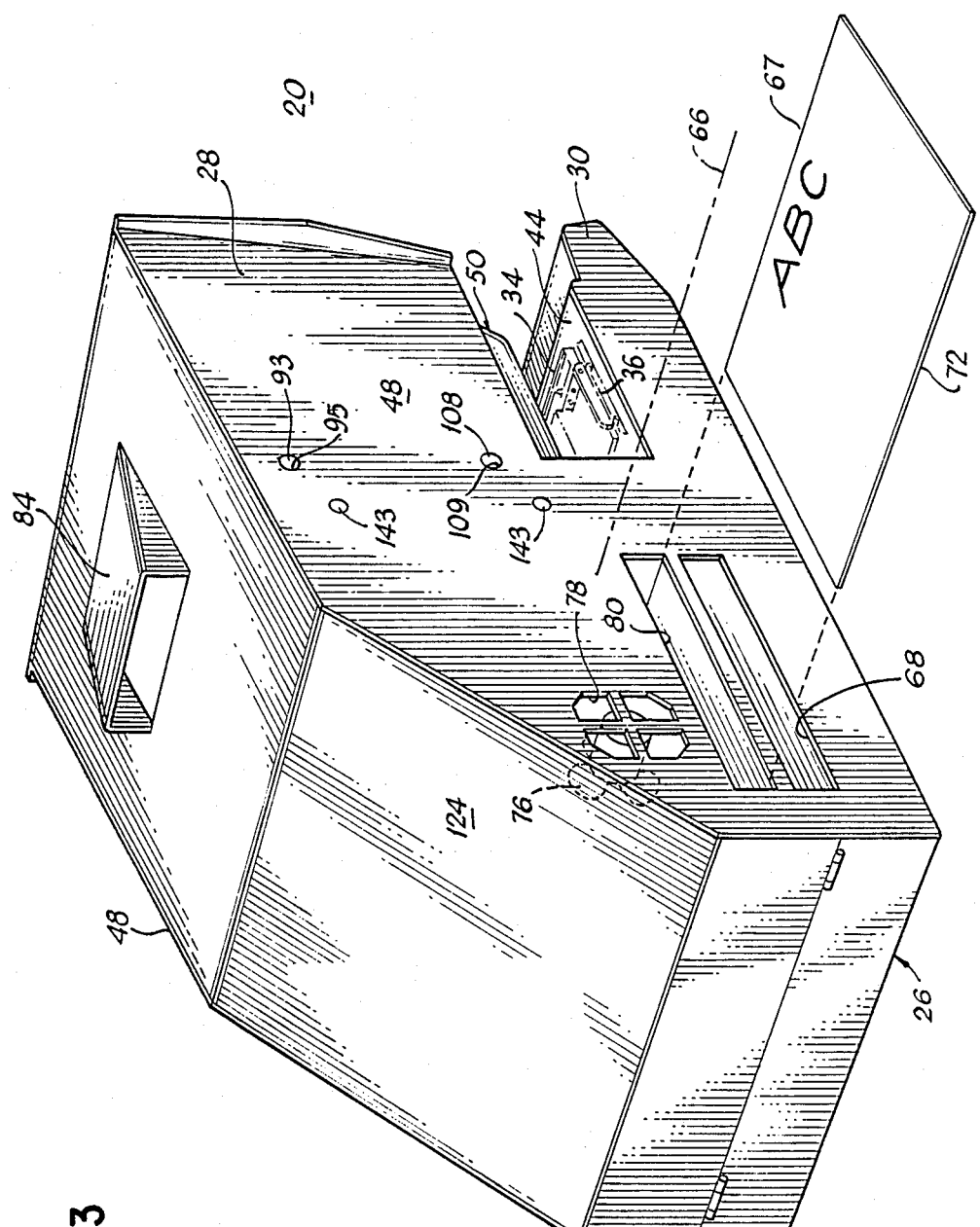
FIG. 3 is a rear perspective view of the apparatus in accordance with the present invention.

The invention is adapted to display and print microimages, such as computer data, recorded on any microform having a plurality of frames 15 wherein the major axis 17 of each frame is oriented transversely, as depicted in FIG. 1b. Computer data comprises the majority of the documents recorded on microfiche. Such data is recorded as depicted in FIG. 1b, and because of the volume of such data, it is desirable to have a microfiche reader-printer capable of displaying and reproducing such documents utilizing the entire area of the viewing screen or hard copy paper, preferably without the need for an image rotating prism. The apparatus in accordance with the present invention achieves this objective and can display the microimage and, if desired, print the microimage onto standard recording paper (e.g., 8-½-inch by 11-inch) as shown in FIG. 3. The microimage is printed lengthwise (e.g. text printed parallel to the 11-inch edge) onto the recording paper to avoid having to reduce the image or having a portion of the image cut-off.

Referring to FIG. 2, the microfiche reader-printer apparatus in accordance with the present invention is generally identified by the reference numeral 20 and includes a housing 26. The housing 26 has a generally inverted C-shaped profile having an upper portion 28 which carries a viewing screen 29 and a lower portion 30 which forms a base for the apparatus 20. Microfiche 33 is received into a microfiche carriage 38 which is slidably mounted with respect to the bottom portion of the housing 26. The microfiche carriage 38 is slidably mounted on a pair of spacedapart rails 36 which are oriented generally parallel to the longitudinal axis of the apparatus 20. The microfiche 33 is placed onto the microfiche carriage 38 such that the micromiages on the microfiche 33 are oriented as shown in FIG. 1b and are positioned such that a single frame is placed over a rectangular aperture in the carriage 38. The carriage 38 is moved manually relative to the housing 26 to view and print various frames 15 on the microfiche 33.

Figure 4:
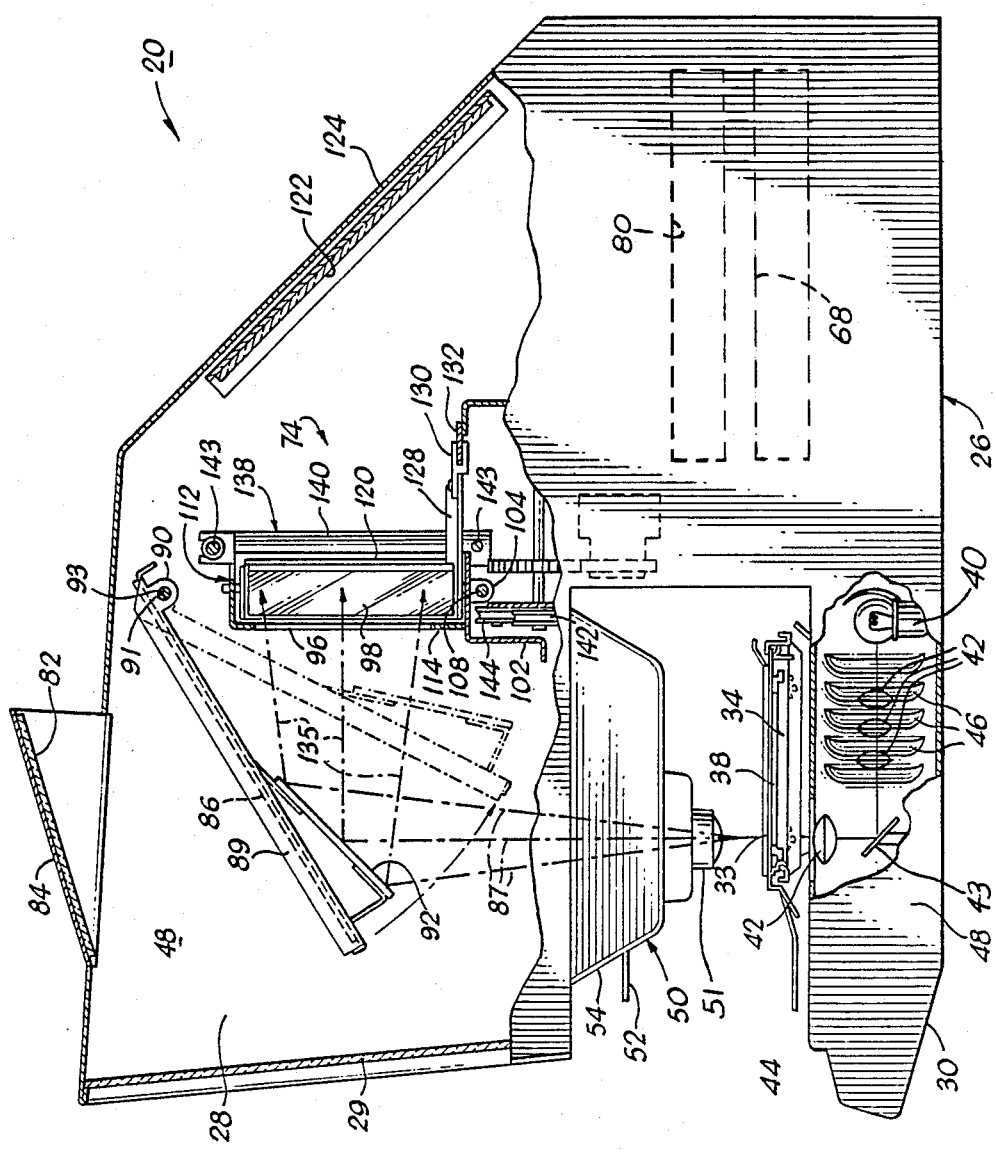
FIG. 4 is a side elevational view partially broken away of the apparatus in accordance with the present invention.

The position of the microfiche 33 onto the carriage 38 defines an object plane which is generally parallel to the base of the housing 26 and generally perpendicular to the viewing screen 29. A lamp 40 mounted in the lower portion 30 of the housing 26 is mounted such that light rays are projected therefrom in a direction generally perpendicular to the object plane. The lamp 40 is fixedly mounted to the lower portion 30 of the housing 26 and is oriented so as to be able to project light rays through the aperture in the microfiche carriage 38. A plurality of lenses 42 and mirror 43 direct the light from the lamp 40 through the microfiche 33 in the carriage 38. Louvers 46 may be provided in the sidewalls 48 of the lower portion 30 of the housing 26 to allow heat transfer of the heat developed from the lamp 40 (FIG. 4). A fan (not shown) may also be used.

A bezel 50 mounted to the upper portion 28 of the housing 26 may contain one or more magnification lenses (not shown) for providing selective levels of magnification of the microimage. For example, as shown in FIG. 2, a control lever 52 projects outwardly from the front face 54 of the bezel 50. The control lever 52 may be rigidly connected to a magnification lens carriage (not shown) which is slidably mounted within the bezel 50 in a direction parallel to the transverse axis 66 of the machine 20. A plurality of lenses 51, adapted to be coaxially positioned over the condenser lenses 42, may be disposed on the carriage such that various magnification levels can be selected by moving the control lever 52 within the slot 56 in the front face 54 of the bezel 50 to produce various magnifications of the image. The magnification assembly (not shown) contained within the bezel 50 may also be provided with means (not shown) for focusing the lenses coupled to a focusing knob 55 on the front face 54 of the bezel 50 by moving the magnification lenses vertically to vary the distance between the lens and the object plane.

The microimage may be printed on standard recording paper by any known electrophotographic process and is not considered to be critical to the invention. The electrophotographic image recording process is extremely well known and is disclosed in U.S. Pat. Nos. 3,709,603 and 4,129,373, which are hereby incorporated by reference. In general, an electrophotographic image recording process includes the steps of projecting a microimage onto a photoconductive drum by way of various mirrors. The image formed on the photoconductive drum is then coated with a toner and subsequently transferred to recording paper. The image is fixed onto the recording paper by passing the paper through heated fusion rollers. More specifically, when the apparatus 20 is in the print mode of operation, the microimage is projected onto a photoconductive drum 64 by a scanning mechanism 74 (FIGS. 5 and 6) and various mirrors as generally illustrated in FIGS. 4, 7, 8 and 9. An image is then formed on the photoconductive drum 64 which is subsequently coated with toner from a developer (not shown). The toner is then transferred to the recording paper 67 and fused thereonto by way of heated fusion rollers 75 or passed under a radiant heater (not shown) to form a permanent image on the recording paper 67 when cool. The heated fusion rollers 75, the photoconductive drum 64 and the scanning mechanism 74 are motor driven. The relationship between the speed of movement of the scanning mechanism and the speed of rotation of the photoconductive drum 64 and rollers 75 is such that the speed of the image projected through the scanner matches the surface speed of the drum 64. After the image is permanently formed on the recording paper 67, it is discharged through a paper discharge slot 80 disposed on the side of the housing 26.

The photoconductive drum 64 is rotatably mounted about an axis 65 which is generally parallel to the object plane and perpendicular to the transverse axis 66 of reader-printer apparatus 20 of the present invention. Standard recording paper 67 is fed into a rectangular slot 68 (FIG. 2) disposed on the one side of the housing 26. As illustrated, the paper 67 is carried by a paper cassette 70 having a stack of recording paper 67 adapted to being fed into the apparatus 20 one sheet at a time. As shown, the recording paper 67 contained within the paper cassette 70 is generally rectangular and is fed into slot 68 such that the lengthwise or longer edges 72 of the recording paper 67 are generally parallel to the transverse axis 66 of the housing 26 and perpendicular to the axis 65 about which the photoconductive drum 64 rotates. Paper can also be fed into the slot 68 a single sheet at a time.

Figure 8:
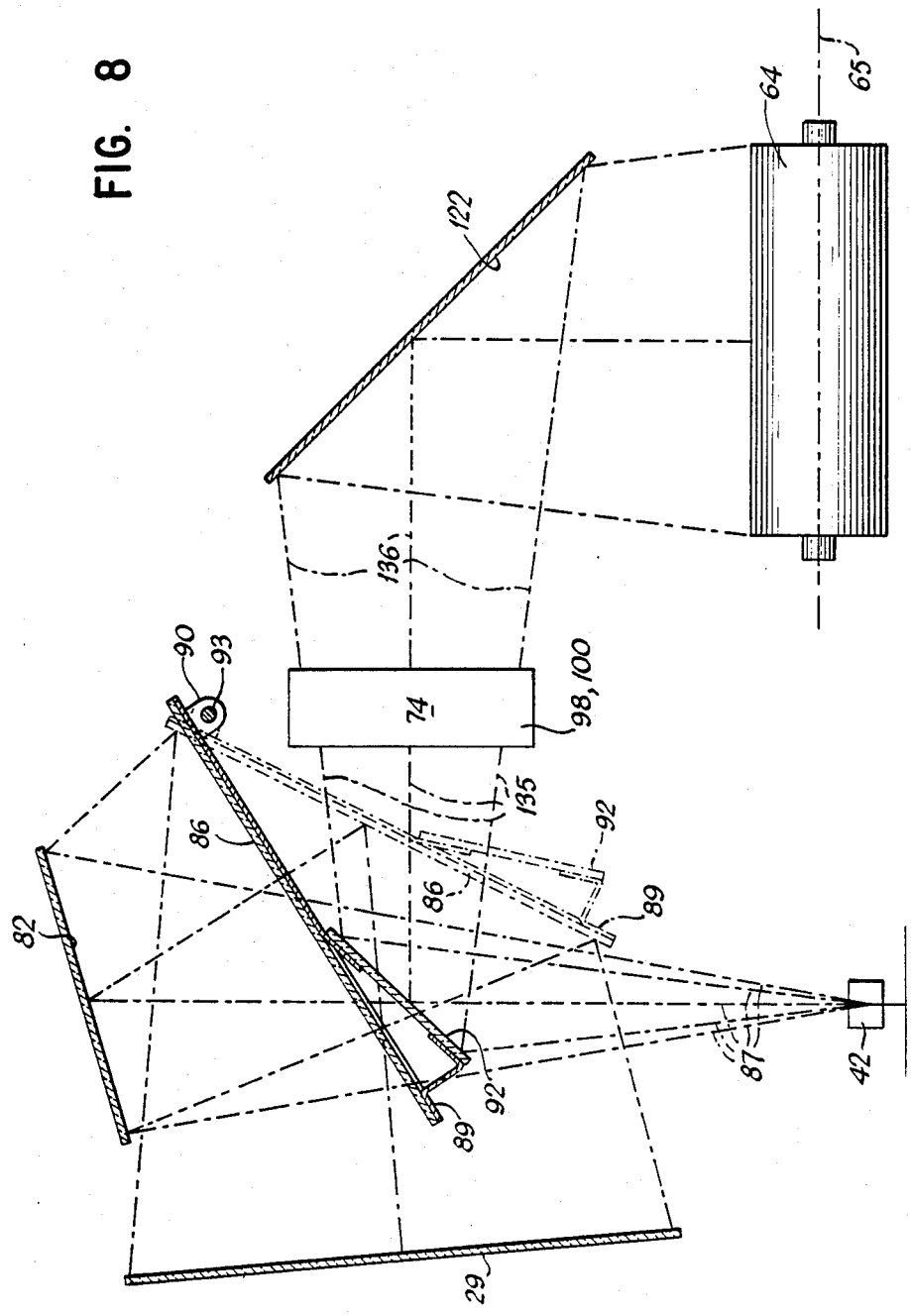
FIG. 8 is an optical schematic illustrating in section the orientation of the light rays in both the viewing mode the printing mode.
Figure 9:
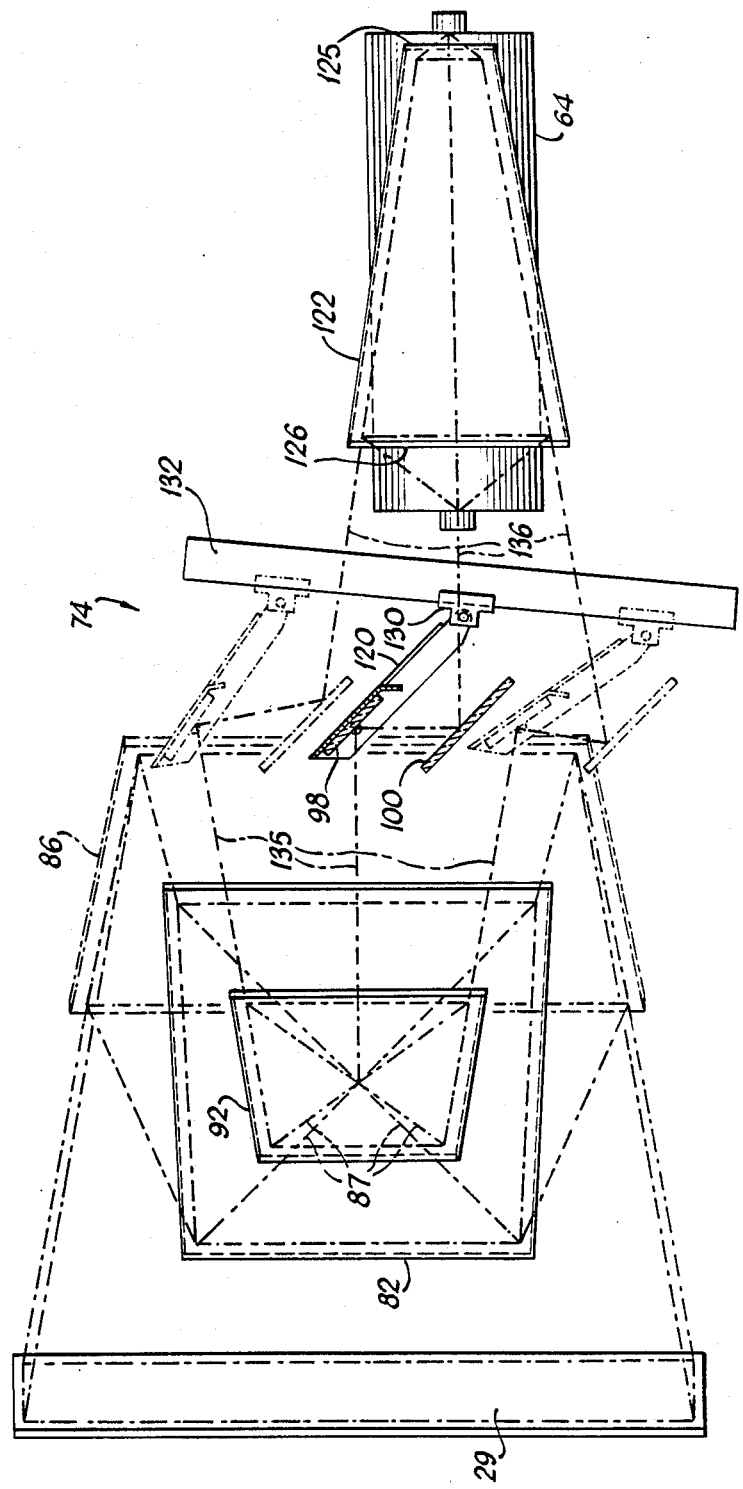
FIG. 9 is an optical schematic illustrating in plan the orientation of the light rays in both the viewing mode and the printing mode.
Figure 10:
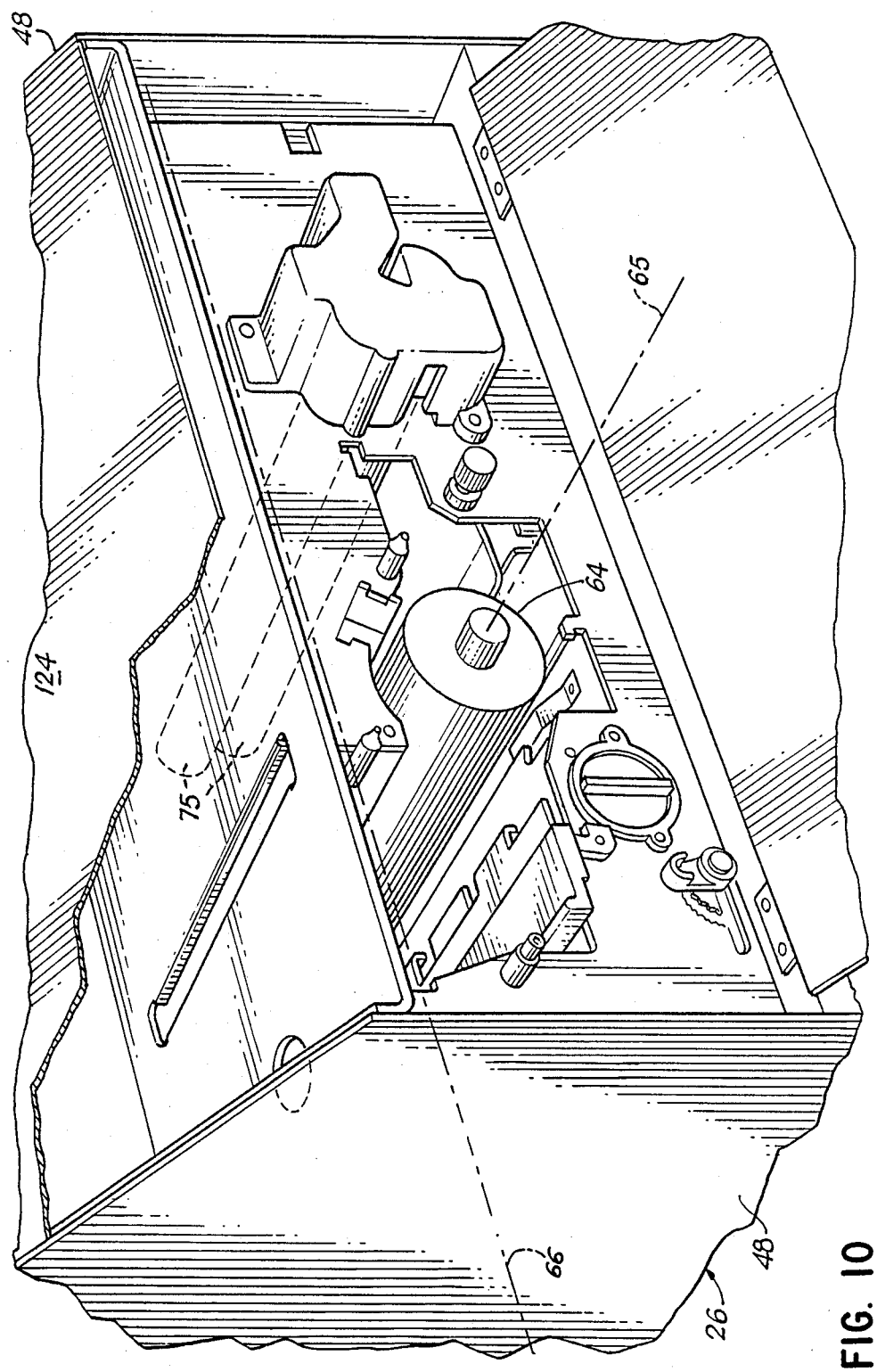
FIG. 10 is a fragmentary perspective view of the rear of the apparatus in accordance with the present invention illustrated with a rear access door open.

The optical system for the present invention includes a plurality of mirrors associated with each of the viewing mode and the printing mode. The orientation of the viewing mode mirrors and the print mode mirrors is illustrated in perspective in FIG. 7. Specifically, two mirrors are used to project the image from the microfiche onto the viewing screen 29. A first viewing mirror 82 is fixedly mounted at an acute angle with respect to the top of the housing 26 and is contained within the ramp-shaped protuberance 84 located at the top of the housing 26. A second viewing mirror 86 is pivotably mounted such that it may be swung out of the way when the machine is operated in the print mode. The second viewing mirror 86 is affixed to a pivotably mounted plate 89. The plate 89 is generally pivotable along one edge about an axis perpendicular to the axis 65 of the photoconductive drum 64. The plate 89 (FIGS. 4, 6 and 8) contains a pair of protuberances 90 disposed perpendicularly from oppositely disposed edges thereof. Apertures 91 in each of the protuberances 90 are coaxially aligned. An elongated rod 93 is slidably received in the apertures 91 and is received at each end in apertures 95 in oppositely disposed side walls 48 in the housing 26. The second viewing mirror 86 is thus adapted to pivot about an axis parallel to the transverse axis 66 of the apparatus 20. As illustrated in FIG. 4, the second viewing mirror 86 is shown in solid lines in the print position and in phantom in the viewing position. When the machine 20 is placed in the print mode, the second viewing mirror 86 is swung out of the optical path and into a print position as shown in the solid lines in FIG. 4. Consequently, no image is formed on the viewing screen 29 when the readerprinter apparatus is in the printing mode. The geometrical orientation of the first viewing mirror 82 and the second viewing mirror 86 with respect to the microfiche 33, is illustrated in FIGS. 8 and 9. In the viewing mode of operation, emergent light rays 87 from the lens 42 are projected onto the first viewing mirror 82 which is fixedly mounted at the top of the housing 26. The light rays 87 are reflected from the second viewing mirror 86 onto the viewing screen 29 which defines a viewing plane. If the image on the microfiche 33 is comprised of computer data, such data would be displayed on the viewing screen 29 so that the data is displayed across the viewing screen reading from left to right and from top to bottom, provided that the microfiche 33 is inserted properly into the microfiche carrage 34.

In the printing mode, the microimage is projected onto the photoconductive drum 64 by way of a plurality of mirrors as will hereinafter be described in detail. A critical aspect of the invention is the ability of the system to print individual frames of microfiche wherein the major axis 17 of each frame 15 is oriented transversely as shown in FIG. 1b. Referring to FIGS. 4, 7, 8 and 9, four printing mode mirrors are provided and generally oriented to project the image onto the photoconductive drum 64. A first printing mirror 92 is pivotably mounted and is secured to the rear of a pivotable plate 89 at an acute angle. As illustrated in FIG. 4, the first printing mirror 92 is shown in the printing position in solid lines and in the viewing position in phantom. As should be apparent, when the apparatus 20 is operated in the viewing mode, the first printing mirror 92 is displaced away from the light path of the emergent light rays 87 from the mirror 43. Accordingly, in the viewing mode the image from the microfiche 33 will be displayed on the viewing screen 29 and will not be projected onto the photoconductive drum 64. Conversely, when the apparatus 20 is in the printing mode, the second viewing mirror 86 is displaced away from the light path and consequently, the image is not dislayed on the viewing screen 29 but, rather, is projected onto the photoconductive drum 64.

Figure 5:
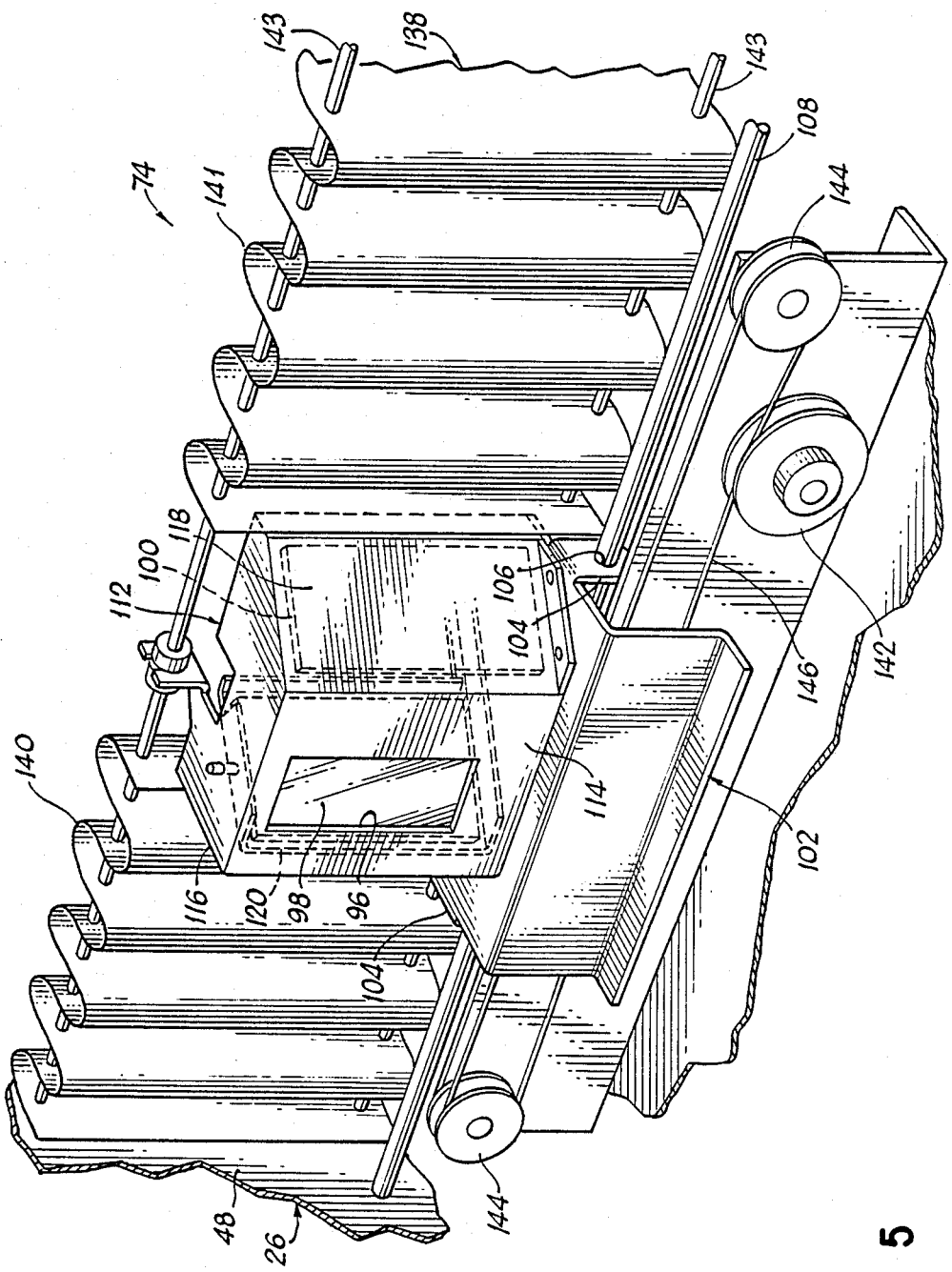
FIG. 5 is a fragmentary perspective view of the front of a scanning mechanism in accordance with the present invention.
Figure 6:
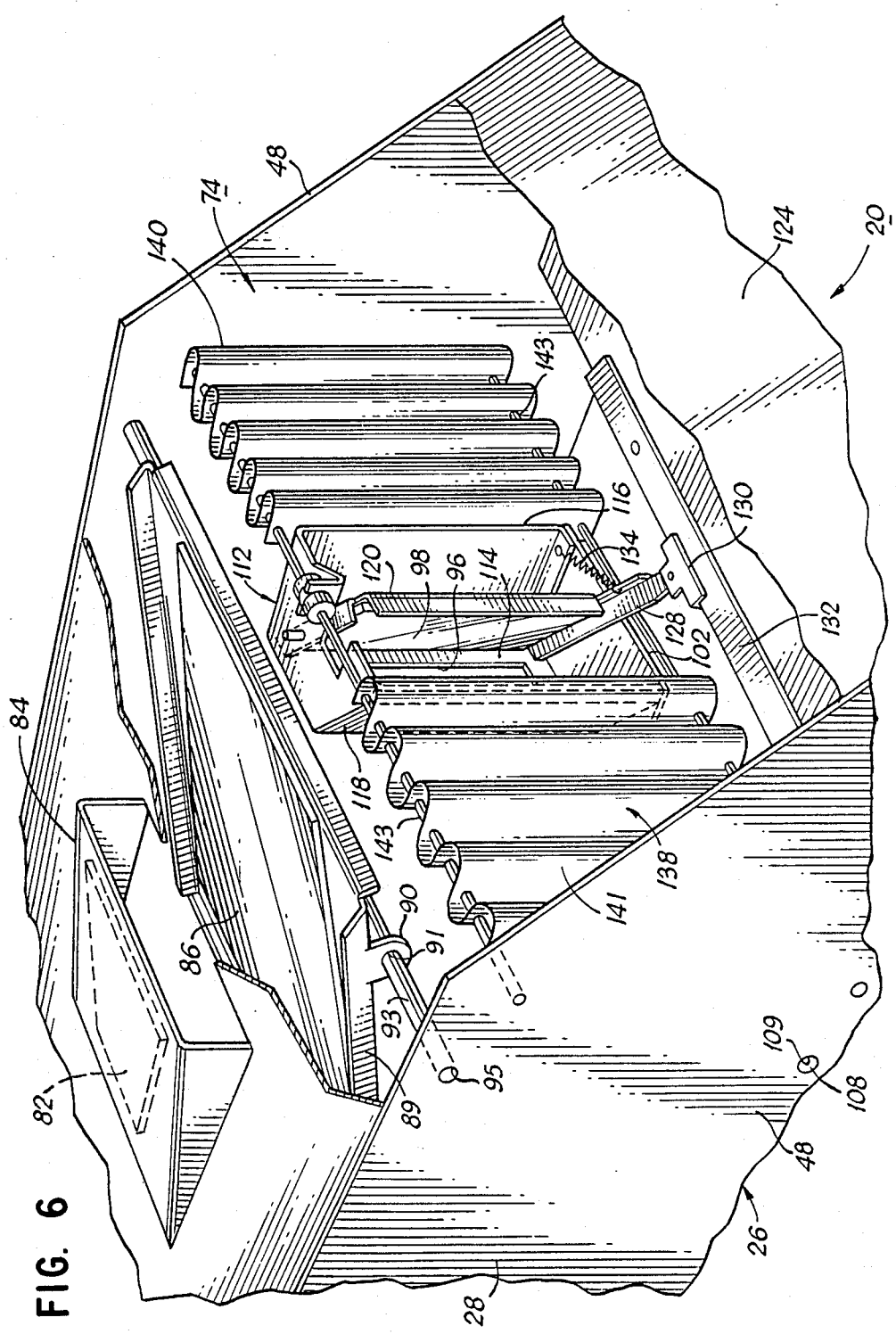
FIG. 6 is a fragmentary perspective view of the rear of the scanning mechanism in accordance with the present invention.
Figure 7:
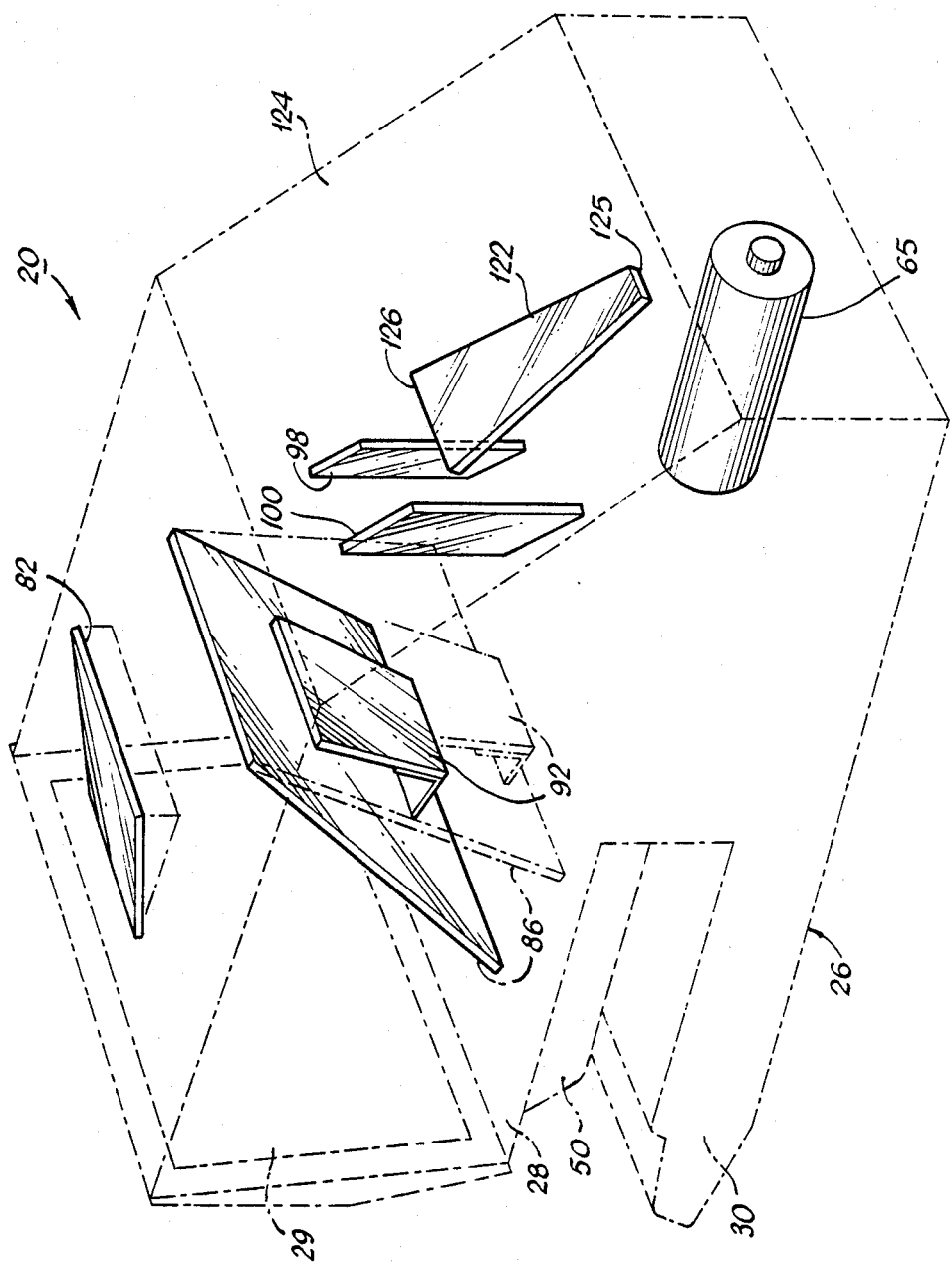
FIG. 7 is a perspective view of the apparatus of FIG. 2 illustrating the orientation of the printing and viewing mirrors within the apparatus of FIG. 1 with the external housing shown in phantom.

Another important aspect relates to the scanning mechanism 74 (FIGS. 5 and 6). The scanning mechanism 74 includes a slit 96 and a pair of mirrors, hereinafter referred to as the second printing mirror 98 and the third printing mirror 100, mounted on a member 102, which is slidably mounted about an axis generally perpendicular to the axis about which the photoconductive drum 64 rotates and generally parallel to the viewing plane. The member 102 has generally a step-like form and includes a pair of protuberances 104, each having an aperture 106. The protuberances 104 are disposed on opposite ends of the member 102 such that the apertures 106 are coaxially aligned. A guide rod 108, disposed generally parallel to the transverse axis of the apparatus 66, is received at each end in apertures 109 (FIG. 2) in oppositely disposed side walls 48 of the housing 26. The guide rod 108 is slidingly received into the apertures 106 in the protuberances 104 for guiding movement of the member 102 and defining a scanning axis. Another member 112 is rigidly secured to the member 102 and includes a front wall 114 oriented generally parallel to the guide rod 108 and perpendicular to the axis of rotation 65 of the photoconductive drum 64. The front wall 114 has a rectangular slit 96 which is used to project only a portion or vertical slice of the image onto the photoconductive drum 64 at a time. A side wall 116 of the member 112 is connected generally perpendicularly to the front wall 114 along the left vertical edge (FIG. 5). Another side wall 118 of the member 112 is connected along the right vertical edge of the front wall 114 at a generally obtuse angle therewith. The third printing mirror 100 is rigidly affixed to the interior side of the side wall 118. The second printing mirror 98 is pivotably mounted within the scanning mechanism 74. The position of the second printing mirror 98 is altered as a function of the position of the scanning mechanism 74 along the guide rod 108. More specifically, the second printing mirror 98 is affixed to a pivotably mounted plate 120. The plate 120 is pivotably connected along one edge such that it is pivotable about a vertical axis, generally perpendicular to the image plane. The second printing mirror 98 is ridigly affixed to the plate 120. When the plate 120 and consequently the second printing mirror 98 are pivoted, a portion of the image will be reflected to the fixedly mounted third printing mirror 100 and subsequently to the fourth printing mirror 122, and finally onto the photoconductive drum 64. The fourth printing mirror 122 is fixedly mounted to the inside of a sloping roof 124 portion of the housing 26 directly over the photoconductive drum 64. Because of the orientation of the photoconductive drum 64 with respect to the scanning direction, the fourth printing mirror 122 is trapezoidal in shape and is oriented such that its longitudinal axis is in the same plane as the axis 65 about which the photoconductive drum 64 rotates. The short leg 125 of the trapezoid is positioned at one end of the photoconductive drum 64 which is furthest away from the scanning mechanism 74 whereas the long leg 126 of the trapezoid is positioned at the opposite end of the photoconductive drum 64 closest to the scanning mechanism 74.

As best shown in FIGS. 6 and 9, the position of the second printing mirror 98 is a function of the position of the scanning mechanism 74 along the guide rod 108. More specifically, one end of a control lever 128 controls the pivotal movement of the pivotably mounted plate 120 to which the second printing mirror 98 is affixed. The other end of the control lever 128 is connected to a cam-bar follower 130. The cam-bar follower 130 is adapted to slide along an elongated cam bar 132 as the scanning mechanism 74 travels along the guide rod 108. The cam bar 132 is mounted such that its longitudinal axis forms an acute angle with respect to the guide rod 108. As scanning mechanism 74 travels along the guide rod 108, the cam-bar follower 130 slides along the cam-bar 132 and varies the angle of the control lever 128 with respect to the guide rod 108 which, in turn, varies the position of the second printing mirror 98. Consequently, the control lever 128 changes the position of the second printing mirror 98 as a function of the position of the scanning mechanism 74 along the guide rod 108. A spring 134, connected betwen the control lever 128 and the side wall 116 of the scanning mechanism 74 may be used to bias the control lever 128. In operation, as the scanning mechanism 74 travels along the guide rod 108, emergent light rays 135 from the first printing mirror 92 are projected onto the second printing mirror 98, the third printing mirror 100, the fourth printing mirror 122 and finally onto the photoconductive drum 64. As the scanning mechanism 74 travels from one end of the guide rod 108 to the other end, consecutive vertical slices of the image are formed on the photoconductive drum 64 at the same rate of speed as the surface speed of the drum 64. The surface of the cam bar 132 that contacts the cam follower 130 is slightly curved so that the scan speed matches the surface speed of the drum throughout the entire scanning cycle.

The scanning mechanism 74 is moved along the guide rod 108 by a motor (not shown). A drive pulley 142 and a pair of idler pulleys 144 carry a traction cable 146. The traction cable 146 is affixed to the scanning mechanism 74 such that the scanning mechanism 74 is displaced along the guide rod 108 when the drive pulley 142 rotates. The speed of the scanning mechanism is coordinated with the speed of the drive motor (not shown) for the photoconductive drum 64 in a known fashion.

As best shown in FIGS. 5 and 6, the side walls 116 and 118 of the scanning mechanism 74 are connected to a travelling curtain 138 to shield the photoconductive drum 64 from light rays except those which are projected through the slit 96. The travelling curtain 138 contains two portions 140 and 141. The portion 140 is connected between the side wall 116 of the member 112 and one side wall of the housing 26. The other portion 142 is connected between the side wall 118 of the member 112 and an oppositely disposed side wall of the housing 26. Each portion of the travelling curtain 138 is carried by a pair of parallel curtain rods 143 which are mounted such that the longitudinal axis of the curtain rods 143 is generally parallel to the longitudinal axis of the guide rod 108. The curtain rods 143 are received in a plurality of coaxially aligned apertures in the curtains 138 disposed along the top and bottom of the curtains 138. Since the curtains 138 are fixedly attached to the scanning mechanism 74 and the interior walls of the housing 26, the curtains 138 are moved along the curtain rods 143 by the scanning mechanism 74 such that emergent light rays from the first printing mirror 92 may only pass through the slit 96.

Thus, it should be apparent that an improved reader-printer apparatus has been disclosed which can print microimages onto standard recording paper without the use of a prism wherein the major axis of each frame of the microfiche is oriented transversely. The system can be implemented in a number of ways, all of which are contemplated to be within the scope of the appended claims.

What is claimed and desired to be secured by Letters Patent of the United States:

1. A viewing and slit exposure type image recording apparatus for recording a two-dimensional microimage having a major axis and a minor axis on a microform onto a recording medium, said apparatus also having a viewing plane, said apparatus comprising:
    means defining an object plane generally perpendicular to said viewing plane for receiving said microform;
    means for recording said microimage onto a recording medium including a drum for carrying said recording medium, said drum being rotatably mounted about an axis generally parallel to said object plane and generally perpendicular to said major axis; and
    means for selectively projecting said microimage onto said viewing plane or onto said drum by scanning consecutive portions of said microimage along an axis generally perpendicular to the axis about which said drum rotates and parallel to said viewing plane;
    wherein said projecting means includes at least one elongated mirror having a longitudinal axis, the longitudinal axis of said mirror being perpendicular to the axis of rotation of said drum.

2. A viewing and slit exposure type image recording apparatus as recited in claim 1 wherein said microform is microfiche.

3. A viewing and slit exposure type image recording apparatus as recited in claim 1 wherein said card microform is microfilm.

4. A viewing and slit exposure type image recording apparatus as recited in claim 1 wherein said microform is an aperture card.

5. A viewing and slit exposure type image recording apparatus as recited in claim 1 wherein said projecting means includes an even number of viewing mirrors to project the microimage onto the viewing plane.

6. A viewing and slit exposure type image recording apparatus as recited in claim 5 wherein said even number is two.

7. A viewing and slit exposure type image recording apparatus as recited in claim 5 wherein at least one viewing mirror is pivotably mounted.

8. A viewing and slit exposure type image recording apparatus as recited in claim 7 wherein said pivotably mounted mirror is pivotable about an axis generally perpendicular to the axis about which said drum rotates.

9. A viewing and slit exposure type image recording apparatus as recited in claim 7 wherein said pivotably mounted mirror is pivotable between a viewing position and a printing position.

10. A viewing and slit exposure type image recording apparatus as recited in claim 9 wherein no image is formed on the viewing plane when said pivotably mounted mirror is in said printing position.

11. A viewing and slit exposure type image recording apparatus as recited in claim 1 wherein said projecting means includes an even number of mirrors to project the microimage onto the recording medium.

12. A viewing and slit exposure type image recording apparatus as recited in claim 11 wherein said even number is four.

13. A viewing and slit exposure type image recording apparatus as recited in claim 12 wherein at least one printing mirror is pivotably mounted about an axis generally perpendicular to the axis about which said drum rotates and generally parallel to said major axis of the microimage.

14. A viewing and slit exposure type image recording apparatus as recited in claim 12 wherein at least one printing mirror is pivotably mounted about an axis generally perpendicular to the axis about which said drum rotates and generally perpendicular to said major axis of the microimage.

15. A viewing and slit exposure type recording apparatus as recited in claim 12 wherein at least two printing mirrors are pivotably mounted wherein the respective axes about which said two printing mirrors are generally perpendicular to each other.

16. A microimage printer apparatus for printing microimages disposed on a microform having a plurality of frames wherein the major axis of each frame is generally oriented in parallel with a first axis of the apparatus when the microform is properly inserted into said apparatus, comprising:
    means for receiving a microform and orienting the frames on said microform such that the major axis of each frame thereon is generally parallel with said first axis of said apparatus;
    means for recording said microimage onto a recording medium, including a drum which carries said recording medium and is rotatably mounted about an axis generally perpendicular to said first axis; and
    scanning means for projecting said microimage onto said drum, said scanning means being movable along a scanning axis that is generally perpendicular to the axis of rotation of said drum;
    wherein said scanning means includes at least one elongated mirror having a longitudinal axis, the longitudinal axis of said mirror being perpendicular to the axis of rotation of said drum.

17. A microimage printer apparatus as recited in claim 16, further including:
    a viewing screen; and
    means for selectively projecting said microimage onto said viewing plane or alternatively onto said drum.

18. A microimage printer apparatus as recited in claim 17 wherein said projecting means includes means for scanning consecutive portions of said microimage.

19. A microimage printer apparatus as recited in claim 18 wherein said scanning means is slidably mounted along an axis which is generally perpendicular to the axis about which the drum rotates.

20. A microimage printer apparatus as recited in claim 19 wherein said scanning means contains an even number of printing mirrors.

21. A microimage printer apparatus as recited in claim 20 wherein said even number is two.

22. A microimage printer apparatus as recited in claim 21 wherein at least one of said printing mirrors is pivotably mounted.

23. A microimage printer apparatus as recited in claim 22 wherein said pivotably mounted printing mirror is pivotably mounted about an axis which is generally perpendicular to the axis about which the drum rotates.

24. A scanning device for a slit image printing apparatus for scanning consecutive portions of a microimage and projecting consecutive portions onto a recording device, comprising:
a guide rod;
a carrier slidably mounted along said guide rod;
a slit member and a plurality of mirrors carried by said carrier adapted to project a portion of said microimage onto the recording device.

25. A scanning device as recited in claim 24 wherein at least one mirror is pivotably mounted.

26. A scanning device as recited in claim 25 wherein said pivotably mounted mirror is pivotable about an axis generally perpendicular to the longitudinal axis of said guide rod.

27. A scanning device as recited in claim 24 wherein said scanning device has an even number of mirrors.

28. A scanning device as recited in claim 27 wherein said even number is two.

29. A scanning device as recited in claim 26 wherein the angular position of the pivotably mounted mirror is related to the position of the carrier along the guide rod.

30. A scanning device as recited in claim 29 further including an elongated cam bar mounted in a predetermined relationship with respect to said guide rod.

31. A scanning device as recited in claim 30 wherein said cam bar has a surface having a predetermined curvature for rendering said scanning system operative to project said consecutive portions onto said recording medium at a constant scanning speed.

32. A scanning device as recited in claim 30 wherein said cam bar is mounted at an acute angle with respect to the guide rod.

33. A scanning device as recited in claim 30 further including means for varying the position of said pivotable mirror as a function of the position of the carrier with respect to said cam bar.

34. A scanning device as recited in claim 33 wherein said position varying means includes a cam bar follower and a control lever wherein said control lever is coupled between said cam bar follower and said pivotably mounted mirror.

35. A scanning device for a slit image printing apparatus, comprising:
a guide rod defining a scanning axis;
a carriage slidably carried by said guide rod; and
means for scanning a portion of a microimage including a slit member and one or more mirrors wherein at least one mirror is pivotably mounted about an axis generally perpendicular to the scanning axis.

36. A scanning device as recited in claim 35 further including means for varying the position of the pivotably mounted mirror as a function of the position of the carriage with respect to the guide rod.

37. A viewing and slit exposure type recording apparatus for recording a two-dimensional microimage having a major axis and a minor axis onto a recording medium, comprising:
means defining an object plane for receiving said microimage;
means for recording said microimage onto said recording medium having a drum for carrying said recording medium, said drum being rotatably mounted about an axis generally perpendicular to the major axis of the microimage;
means for scanning said microimage, said scanning means having at least one elongated scanning mirror having a longitudinal axis, the longitudinal axis of said scanning mirror being perpendicular to the axis of rotation of said drum.

38. Apparatus as recited in claim 37 wherein the major axis of said microimage, the axis of rotation of said drum and the longitudinal axis of said scanning mirror are mutually perpendicular.

39. Apparatus as recited in claim 37 said scanning means having means for moving said mirror along a scanning axis, said scanning axis being perpendicular to the longitudinal axis of said mirror and to the axis of rotation of said drum.

40. Apparatus as recited in claim 39 wherein said scanning mirror is pivotably mounted about its longitudinal axis.

41. Apparatus as recited in claim 40 wherein said scanning means includes means for rotating said scanning mirror during scanning.

42. Apparatus as recited in claim 39 further including a viewing screen, said scanning axis being generally parallel to said viewing screen.

43. A viewing and slit exposure type recording apparatus for recording a two-dimensional microimage having a major axis and a minor axis onto a recording medium, comprising:
means defining an object plane for receiving said microimage;
means for recording said microimage onto said recording medium having a drum for carrying said recording medium, said drum being rotatably mounted about an axis of rotation;
means for scanning said microimage, said scanning means having at least one elongated scanning mirror having a longitudinal axis, the longitudinal axis of said scanning mirror being perpendicular to the axis of rotation of said drum and to the major axis of the microimage.

44. Apparatus as recited in claim 43 wherein the major axis of said microimage, the axis of rotation of said drum and the longitudinal axis of said scanning mirror are mutually perpendicular.

45. Apparatus as recited in claim 44 said scanning means having means for moving said mirror along a scanning axis, said scanning axis being perpendicular to the longitudinal axis of said mirror and to the axis of rotation of said drum.

46. Apparatus as recited in claim 45 wherein said scanning mirror is pivotably mounted about its longitudinal axis.

47. Apparatus as recited in claim 46 wherein said scanning means includes means for rotating said scanning mirror during scanning.

48. Apparatus as recited in claim 45 further includes a viewing screen, said scanning axis being generally parallel to said viewing screen.

* * * * *